March 9, 1937. A. O. HURXTHAL Re. 20,285

DIRECT MOTOR DRIVE FOR DISK FANS

Original Filed Feb. 27, 1934

Inventor:
Alpheus O. Hurxthal
by his Attorneys
Howson & Howson

Reissued Mar. 9, 1937

Re. 20,285

UNITED STATES PATENT OFFICE 20,285

DIRECT MOTOR DRIVE FOR DISK FANS

Alpheus O. Hurxthal, Philadelphia, Pa., assignor to Proctor & Schwartz, Incorporated, Philadelphia, Pa., a corporation of Pennsylvania Original No. 2,050,180, dated August 4, 1936, Serial No. 713,216, February 27, 1934. Application for reissue October 26, 1936, Serial No. 107,693

14 Claims. (Cl. 172—36)

Figures 1, 2:
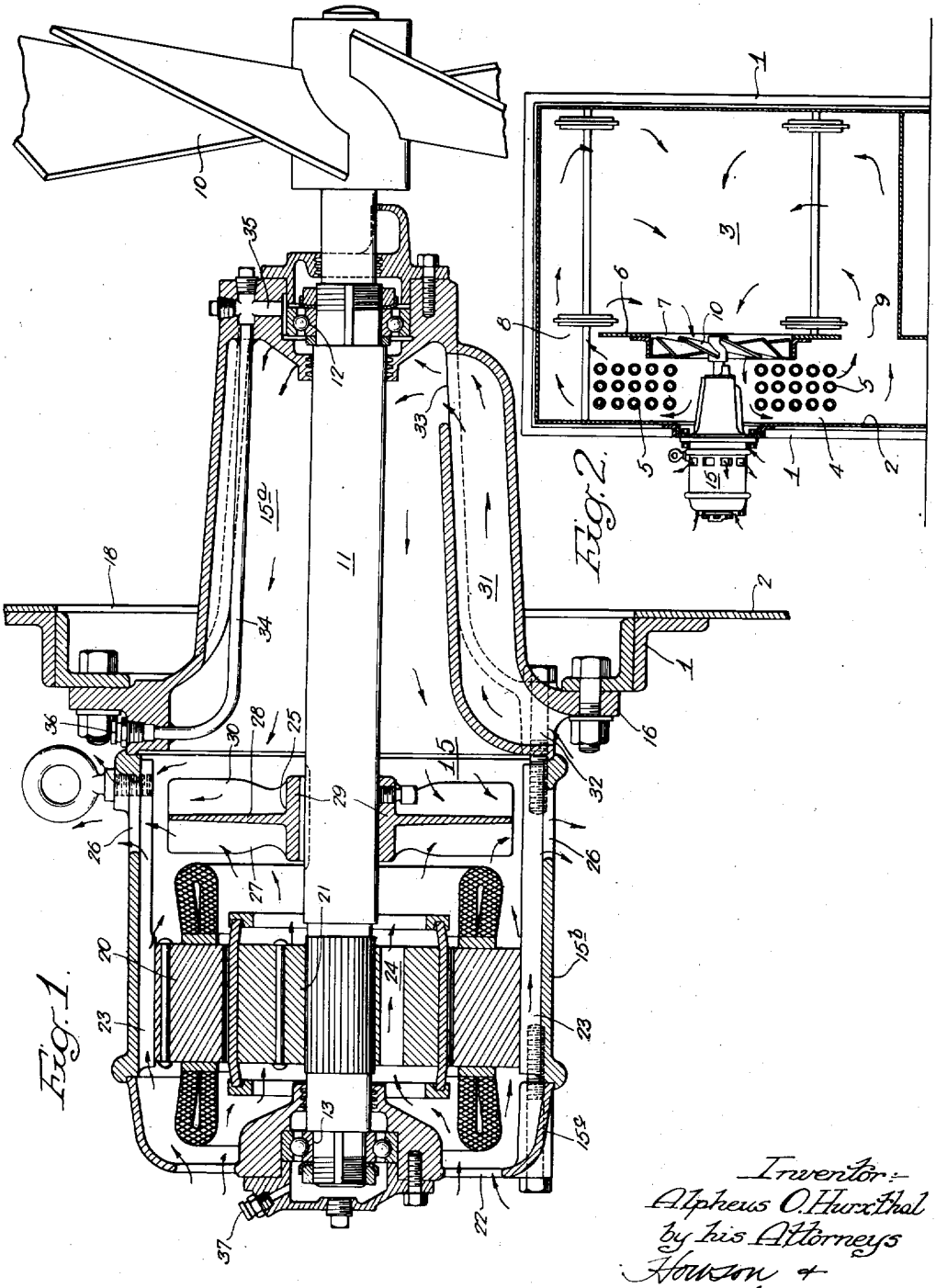

This invention relates to power units for driving air-circulating fans of drying machines; and particularly to a unit comprising a direct motor drive for a fan of the disk type.

In connection with the manufacture and operation of driers and similar apparatus requiring the use of a fan for circulating a conditioning or treating medium in a substantially closed chamber, the disk type fan is used to a considerable extent.

Since in this type of fan the air or other medium being circulated thereby is drawn into and through the fan from one side thereof and discharged from the fan at the opposite side thereof, it is evident that space must be provided at both sides of the fan to permit it to operate efficiently.

In order to space the fan inwardly from the walls of the chamber to permit circulation of the medium as above noted and in order to effect rotation of the fan at speeds necessary to provide efficient circulation of the medium in the chamber it is necessary to employ a shaft extending into the chamber from at least one wall thereof.

In order to support the shaft and fan for rotation at the required speeds a bearing for the shaft must be placed adjacent the fan, inside the chamber, and another bearing must be placed near the point on the shaft at which power is applied to the shaft. Usually, as in the case of belt-driven fans, this second bearing is placed outside the chamber or immediately adjacent the wall, either inside or outside thereof, through which the shaft extends. The driving pulley in each instance is placed outside the outer bearing.

In many instances, such for example as where high velocity circulation is required, it is desirable to connect the fan shaft direct to a motor shaft. The motor may be of any desired kind, for example a steam or air turbine but preferably an electric motor of a suitable type according to the nature of the current available.

This form of drive has met with favor but as practiced has some troublesome characteristic. For example, it is not practical to extend the motor shaft sufficiently from one side of the motor to provide the air space between the one side of the fan and the wall which carries the motor as such necessitates the use of a long overhang in the shaft between the fan and the nearest supporting bearing.

In order to overcome this objection in some instances the motor has been set in a cavity in the wall of the chamber with the motor bearing immediately adjacent the fan. This, however, is objectionable for the reasons that despite precautions the motor heats up excessively, lubrication of the motor bearings is difficult and the presence of the full diameter of the motor so close to the fan reduces the efficiency of the latter.

In most instances, however, the motor has been maintained outside the chamber and a supplemental fan shaft has been aligned with and coupled to the rotor shaft of the motor and supported by a supplemental bearing located inside the chamber adjacent the fan.

Driers and other processing and treating apparatus which are usually constructed of light structural steel having no true machined surfaces and subject to considerable expansion, contraction and more or less warping, as a result of temperature conditions, makes it practically impossible to effect and maintain true alignment between the three bearings which support the rotor and supplemental shafts, i. e. the two motor bearings and the supplemental bearing, consequently this dual fan shaft and the coupling between the two sections thereof is placed under lateral as well as torque strains, causing trouble in the coupling; and the bearings, due to such lateral strains, heat up and wear excessively.

The object of the present invention is to provide a direct motor drive for fans which obviates each and all the above noted disadvantages of the structures of the prior art and at the same time incorporates all the desirable features attending the use of this form of drive.

The construction and operation of the unit forming the subject matter of the present invention will be fully disclosed hereinafter, reference being had to the accompanying drawing, of which:

Fig. 1 is a longitudinal sectional elevation of the unit; and

Fig. 2 diagrammatically illustrates the unit as applied to a drier of any desired type, the drier being shown in sectional elevation.

As shown in Fig. 2, a drier or other treating or processing apparatus usually comprises a structural framework 1 covered with sheet metal or other sheathing 2 which in many instances is of a double wall construction filled with a suitable heat-insulating material. Frequently the walls of the apparatus are made up of panels which are secured to and readily removable from the structural framework 1.

In any event the walls 2 enclose and form a chamber 3 in which material is placed for treatment, and a chamber 4 in which are disposed steam or other heating or medium conditioning pipes 5.

The chamber 4 is separated from the chamber 3 by a partition 6 in which is formed a circular opening 7 for the fan 10, which by rotation within the opening 7 causes a circulation of air or other medium through the opening 6, from the chamber 3 into the chamber 4 and through this latter chamber and returning to the first chamber through openings 8 and 9 formed adjacent the top and bottom respectively of the partition 6.

The fan 10 in the unit made according to the principles of the present invention is secured to one end of a continuous one piece shaft 11 which is rotatably mounted in bearings 12 and 13 formed at the opposite ends respectively of a rigid hollow structure 15 which is provided with a suitable transversely extending flange or series of lugs 16 disposed intermediate the ends of the structure and adapted to be secured to the framework as by bolts 17 with one portion 15a extending through an opening 18 into the chamber 4 and another portion 15b disposed outside the casing formed by the walls 2.

According to the principles of the present invention, the bearing 12 is formed on or carried by the innermost end of the portion 15a of the rigid structure 15 and is disposed immediately adjacent the fan 10, while the bearing 13 is formed in or carried by the outermost end of the structure 15 in a third section 15c thereof, which is rigidly secured to the section 15b of said structure.

The section 15b in the present instance constitutes the main or body portion of an electric motor of any suitable type and houses the stator 20 within which the rotor 21, secured to the shaft 11, is adapted to rotate and consequently effect rotation of the shaft 11.

The section 15c constitutes one removable end or bonnet of the motor housing; and the section 15a constitutes the opposite end or bonnet of the motor housing. However, the bonnet 15a in the present instance is elongated to a considerable extent from the usual motor construction to provide the bearing 12 remotely situated with respect to one end of the rotor 21, instead of being in close adjacent relation to the rotor as is usual in electric motors, while the section 15c provides the bearing 13 disposed in close adjacent relation to the opposite end of the rotor 21, in the usual manner.

It is common practice in motor construction to ventilate the motor by circulating air from one end of the motor housing through openings formed in the one bonnet at that end of the motor and through openings formed in or surrounding the stator in the main section of the housing, by a fan located in the bonnet at the opposite end of the motor. In the present instance the motor is ventilated by circulating air through openings 22 formed in the shallow bonnet 15c, through openings 23 formed around and extending across the stator 20, and through openings 24 formed in and extending longitudinally through the rotor 21, by a fan 25 which is keyed and set screwed to the shaft 11 adjacent the inner end of the rotor 21, said air being exhausted through openings 26, formed in the motor section 15b, by centrifugal action set up by a set of blades 27 formed on one side of a disk 28 which constitutes the body of the fan and extends circularly and radially from the hub 29 of the fan on the shaft 11.

In the present instance the fan 25 is of a double construction and comprises a second set of blades 30 formed on the opposite side of the disk 28 from the blades 27.

In the lower portion of and extending longitudinally along the lower portion of the elongated bonnet 15a, in the present instance, is an air duct 31 which has an opening or port 32 outside the flange 16 which establishes communication between the duct 31 and the atmosphere outside the drier casing.

At its opposite end the duct 31 communicates with the interior of the elongated bonnet 15a through an opening or port 33 disposed immediately adjacent the inner bearing 12, for keeping said bearing cool.

Circulation of air in one direction in the bonnet 15a, through the duct 31, around the bearing 12, in an opposite direction through the interior of the bonnet 15a, and outwardly through the exhaust ports 26 is created by the centrifugal action of the blades 30 of the fan, pump or impeller 25.

The disk 28 of the impeller 25 constitutes a baffle between the interior of the elongated hood or bonnet section 15a of the rigid structure 15 and the interior of the motor housing sections 15a and 15c of said structure and thereby prevents the air which becomes heated by radiation from the interior of the chamber 4 to the interior of the bonnet 15a through the metal wall of said bonnet, from passing into the motor housing, thus the impeller serves the dual purpose above noted.

The bearing 12 is lubricated, in the present instance by means of a tube 34 having one end communicating with a passage 35 formed in the innermost end wall of the bonnet 15a which leads the lubricant to, in the present case, the ball races of a ball bearing suitably mounted in the said end wall of said bonnet. The opposite end of the tube 35 communicates with a grease or oil cup or a pressure fitting disposed outside the rigid housing or unit 15.

The tube 34 being wholly within the bonnet 15a in the path of the cooling air circulated through the interior of the bonnet 15a by the impeller 25 maintains the lubricant in the tube at a temperature which prevents its losing viscosity and value as a lubricant in the bearing 12.

The outer bearing 13 for the shaft 11 is supplied with lubricant from and through a suitable oil or grease cup or pressure fitting 37 disposed outside the shallow bonnet 15c of the unit 15.

From the above, it will be apparent that due to the rigidity of the structure 15 the two sole bearings for the shaft 11 are at all times held in strict axial alignment, regardless of expansion and contraction or other distortion of the framework 1 upon which the rigid structure 15 is mounted and to which it is secured at and in a single transverse plane intermediate said bearings; that the shaft 11 is supported firmly adjacent the fan 10; and that the inner bearing is cooled and lubricated efficiently despite its location well within the heated chamber of the apparatus in which the unit is installed.

I claim:

1. A direct motor drive unit comprising a rigid elongated unitary hollow housing, means extending transversely of and from the housing intermediate its opposite ends for solely supporting the unit, a one piece shaft extending longitudinally through and beyond one end of the housing, a pair of bearings respectively disposed at the opposite ends of the housing and affording the sole means of support for the shaft, driven means secured to the projecting end of the shaft adjacent one of said bearings, a motor in the opposite end of the housing between the plane of the supporting means and the second of said bearings with the rotor of said motor mounted directly on said shaft, and the portion of the housing between the housing-supporting means and said driven means tapering toward said driven means.

2. A direct motor drive unit comprising a rigid elongated unitary hollow housing, means extending transversely of and from the housing intermediate its opposite ends for solely supporting the unit, a one piece shaft extending longitudinally through and beyond one end of the housing, a pair of bearings respectively disposed at the opposite ends of the housing and affording the sole means of support for the shaft, driven means secured to the projecting end of the shaft adjacent one of said bearings, a motor in the opposite end of the housing between the plane of the supporting means and the second of said bearings with the rotor of said motor mounted directly on said shaft, and the portion of the housing between the housing-supporting means and said driven means tapering toward said driven means, a baffle encircling the shaft between the motor and the tapering end of the housing, and means for drawing cooling air into the tapering end of the housing and circulating said air around the shaft bearing therein and exhausting said air from the housing adjacent the baffle.

3. A direct motor drive unit comprising a rigid elongated unitary hollow housing, means extending transversely of and from the housing intermediate its opposite ends for solely supporting the unit, a one piece shaft extending longitudinally through and beyond one end of the housing, a pair of bearings respectively disposed at the opposite ends of the housing and affording the sole means of support for the shaft, driven means secured to the projecting end of the shaft adjacent one of said bearings, a motor in the opposite end of the housing between the plane of the supporting means and the second of said bearings with the rotor of said motor mounted directly on said shaft, and the portion of the housing between the housing-supporting means and said driven means tapering toward said driven means, a baffle disk secured to the shaft intermediate the motor and the tapering end of the housing, and impeller blades on the baffle disk for drawing cooling air through the tapering end of the housing and around the shaft bearing therein, said housing being provided with exhaust ports adjacent the periphery of said baffle disk.

4. A direct motor drive unit comprising a rigid elongated unitary hollow housing, means extending transversely of and from the housing intermediate its opposite ends for solely supporting the unit, a one piece shaft extending longitudinally through and beyond one end of the housing, a pair of bearings respectively disposed at the opposite ends of the housing and affording the sole means of support for the shaft, driven means secured to the projecting end of the shaft adjacent one of said bearings, a motor in the opposite end of the housing between the plane of the supporting means and the second of said bearings with the rotor of said motor mounted directly on said shaft, and the portion of the housing between the housing-supporting means and said driven means tapering toward said driven means, a baffle disk secured to the shaft intermediate the motor and the tapering end of the housing, and impeller blades on the opposite sides respectively of said baffle disk for drawing cooling air through the tapering end of the housing and around the shaft bearing therein at one side of the baffle disk and through the motor at the opposite side of the baffle disk, said housing being provided with exhaust ports adjacent the periphery of the housing.

5. A direct motor drive unit comprising a rigid elongated unitary hollow housing, means extending transversely of and from the housing intermediate its opposite ends for solely supporting the unit, a one piece shaft extending longitudinally through and beyond one end of the housing, a pair of bearings respectively disposed at the opposite ends of the housing and affording the sole means of support for the shaft, driven means secured to the projecting end of the shaft adjacent one of said bearings, a motor in the opposite end of the housing between the plane of the supporting means and the second of said bearings with the rotor of said motor mounted directly on said shaft, and the portion of the housing between the housing-supporting means and said driven means tapering toward said driven means, a baffle disk secured to the shaft intermediate the motor and the tapering end of the housing, impeller blades on the baffle disk for drawing cooling air through the tapering end of the housing and around the shaft bearing therein, said housing being provided with exhaust ports adjacent the periphery of said baffle disk, and means for lubricating the bearing adjacent the end of the housing at which said driven means is located and including a fitting disposed in the motor end of the housing adjacent the plane of the unit-supporting means and a tube leading from said fitting to said bearing and extending through the tapering end of the housing in the path of the cooling air passing therethrough.

6. A direct motor drive unit comprising a rigid elongated unitary hollow housing, means extending transversely of and from the housing intermediate its opposite ends for solely supporting the unit, a one piece shaft extending longitudinally through and beyond one end of the housing, a pair of bearings respectively disposed at the opposite ends of the housing and affording the sole means of support for the shaft, driven means secured to the projecting end of the shaft adjacent one of said bearings, a motor in the opposite end of the housing between the plane of the supporting means and the second of said bearings with the rotor of said motor mounted directly on said shaft, and the portion of the housing between the housing-supporting means and said driven means tapering toward said driven means, an air duct formed in the tapering end of the housing with an inlet communicating with the atmosphere adjacent the unit-supporting means and an outlet communicating with the interior of the housing adjacent the shaft bearing in the tapering end of the housing, and an impeller on the shaft for drawing air through the duct and around said shaft bearing.

7. A direct motor drive unit comprising a rigid elongated unitary hollow housing composed of a cylindrical section, a shallow bonnet secured to one end of the cylindrical section, and a relatively long tapering bonnet secured to the opposite end of said cylindrical section, a motor stator and a motor rotor mounted in said cylindrical section, a shaft extending through said cylindrical section and said bonnets, and to which the motor stator is directly secured, a bearing in the outer end of each of said bonnets affording the sole means of support for said shaft, an annular flange on the long tapering bonnet adjacent the cylindrical section and affording the sole means of support for the unit, driven means secured to the shaft adjacent the bearing in the long tapering bonnet, an air duct having an inlet adjacent said flange and an outlet adjacent the bearing in the tapered end of said long bonnet, a baffle disk on the shaft between the motor and the long bonnet, impeller blades on the opposite sides of said baffle disk for drawing cooling air through said duct and around the bearing in the long tapered bonnet and through openings in said shallow bonnet and said motor and discharging said air through exhaust ports formed in the cylindrical section adjacent the periphery of said baffle disk, and means for lubricating the bearing in the long bonnet comprising a fitting adjacent said annular flange and a tube leading from said fitting to said bearing in the path of the air circulating through said long bonnet.

8. A direct motor drive unit comprising a rigid elongated unitary hollow housing, means extending transversely of and from the housing intermediate its opposite ends for solely supporting the unit, a one piece shaft extending longitudinally through and beyond one end of the housing, a pair of bearings respectively disposed at the opposite ends of the housing and affording the sole means of support for the shaft, driven means secured to the projecting end of the shaft adjacent one of said bearings, and a motor in the opposite end of the housing between the plane of the supporting means and the second of said bearings with the rotor of said motor mounted directly on said shaft.

9. A direct motor drive unit comprising a rigid elongated unitary hollow housing, means extending transversely of and from the housing intermediate its opposite ends for solely supportting the unit, a one piece shaft extending longitudinally through and beyond one end of the housing, a pair of bearings respectively disposed at the opposite ends of the housing and affording the sole means of support for the shaft, driven means secured to the projecting end of the shaft adjacent one of said bearings, a motor in the opposite end of the housing between the plane of the supporting means and the second of said bearings with the rotor of said motor mounted directly on said shaft, a baffle encircling the shaft between the motor and the end of the housing adjacent which said driven means is disposed, and means for drawing cooling air into the last said end of the housing and circulating said air around the shaft bearing therein and exhausting said air from the housing adjacent the baffle.

10. A direct motor drive unit comprising a rigid elongated unitary hollow housing, means extending transversely of and from the housing intermediate its opposite ends for solely supporting the unit, a one piece shaft extending longitudinally through and beyond one end of the housing, a pair of bearings respectively disposed at the opposite ends of the housing and affording the sole means of support for the shaft, driven means secured to the projecting end of the shaft adjacent one of said bearings, a motor in the opposite end of the housing between the plane of the supporting means and the second of said bearings with the rotor of said motor mounted directly on said shaft, a baffle disk secured to the shaft intermediate the motor and the end of the housing adjacent which said driven means is disposed, and impeller blades on the baffle disk for drawing cooling air through the last said end of the housing and around the shaft bearing therein, said housing being provided with exhaust ports adjacent the periphery of said baffle disk.

11. A direct motor drive unit comprising a rigid elongated unitary hollow housing, means extending transversely of and from the housing intermediate its opposite ends for solely supporting the unit, a one piece shaft extending longitudinally through and beyond one end of the housing, a pair of bearings respectively disposed at the opposite ends of the housing and affording the sole means of support for the shaft, driven means secured to the projecting end of the shaft adjacent one of said bearings, a motor in the opposite end of the housing between the plane of the supporting means and the second of said bearings with the rotor of said motor mounted directly on said shaft, a baffle disk secured to the shaft intermediate the motor and the last said end of the housing, and impeller blades on the opposite sides respectively of said baffle disk for drawing cooling air through the last said end of the housing and around the shaft bearing therein at one side of the baffle disk and through the motor at the opposite side of the baffle disk, said housing being provided with exhaust ports adjacent the periphery of the housing.

12. A direct motor drive unit comprising a rigid elongated unitary hollow housing, means extending transversely of and from the housing intermediate its opposite ends for solely supporting the unit, a one piece shaft extending longitudinally through and beyond one end of the housing, a pair of bearings respectively disposed at the opposite ends of the housing and affording the sole means of support for the shaft, driven means secured to the projecting end of the shaft adjacent one of said bearings, a motor in the opposite end of the housing between the plane of the supporting means and the second of said bearings with the rotor of said motor mounted directly on said shaft, a baffle disk secured to the shaft intermediate the motor and the last said end of the housing, impeller blades on the baffle disk for drawing cooling air through the last said end of the housing and around the shaft bearing therein, said housing being provided with exhaust ports adjacent the periphery of said baffle disk, and means for lubricating the bearing adjacent the end of the housing at which said driven means is located and including a fitting disposed in the motor end of the housing adjacent the plane of the unit-supporting means and a tube leading from said fitting to said bearing and extending through the end of the housing at which the driven means is located in the path of the cooling air passing therethrough.

13. A direct motor drive unit comprising a rigid elongated unitary hollow housing, means extending transversely of and from the housing intermediate its opposite ends for solely supporting the unit, a one piece shaft extending longitudinally through and beyond one end of the housing, a pair of bearings respectively disposed at the opposite ends of the housing and affording the sole means of support for the shaft, driven means secured to the projecting end of the shaft adjacent one of said bearings, a motor in the opposite end of the housing between the plane of the supporting means and the second of said bearings with the rotor of said motor mounted directly on said shaft, an air duct formed in the end of the housing at which the driven means is located with an inlet communicating with the atmosphere adjacent the unit-supporting means and an outlet communicating with the interior of the housing adjacent the shaft bearing in the end of the housing at which the driven means is located, and an impeller on the shaft for drawing air through the duct and around said shaft bearing.

14. A direct motor drive unit comprising a rigid elongated unitary hollow housing composed of a cylindrical section, a shallow bonnet secured to one end of the cylindrical section, and a relatively long bonnet secured to the opposite end of said cylindrical section, a motor stator and a motor rotor mounted in said cylindrical section, a shaft extending through said cylindrical section and said bonnets, and to which the motor stator is directly secured, a bearing in the outer end of each of said bonnets affording the sole means of support for said shaft, an annular flange on the long bonnet adjacent the cylindrical section and affording the sole means of support for the unit, driven means secured to the shaft adjacent the bearing in the long bonnet, an air duct having an inlet adjacent said flange and an outlet adjacent the bearing in the end of said long bonnet, a baffle disk on the shaft between the motor and the long bonnet, impeller blades on the opposite sides of said baffle disk for drawing cooling air through said duct and around the bearing in the long bonnet and through openings in said shallow bonnet and said motor and discharging said air through exhaust ports formed in the cylindrical section adjacent the periphery of said baffle disk, and means for lubricating the bearing in the long bonnet comprising a fitting adjacent said annular flange and a tube leading from said fitting to said bearing in the path of the air circulating through said long bonnet.

ALPHEUS O. HURXTHAL.